(12) United States Patent
Leibfried et al.

(10) Patent No.: US 11,949,375 B2
(45) Date of Patent: Apr. 2, 2024

(54) PHOTOVOLTAIC THERMAL MODULE WITH AIR HEAT EXCHANGER

(71) Applicants: Consolar Solare Energiesysteme GmbH, Frankfurt (DE); Triple Solar BV, Amsterdam (NL)

(72) Inventors: Ulrich Leibfried, Loerrach (DE); Cornelis Paul Mager, Amsterdam (NL)

(73) Assignees: Consolar Solare Energiesysteme GmbH, Frankfurt (DE); Triple Solar BV, Amsterdam (NL)

( * ) Notice: Subject to any disclaimer, the term of this patent is extended or adjusted under 35 U.S.C. 154(b) by 1064 days.

(21) Appl. No.: 16/325,037

(22) PCT Filed: Aug. 3, 2017

(86) PCT No.: PCT/EP2017/069742
§ 371 (c)(1),
(2) Date: Feb. 12, 2019

(87) PCT Pub. No.: WO2018/033409
PCT Pub. Date: Feb. 22, 2018

(65) Prior Publication Data
US 2020/0259454 A1    Aug. 13, 2020

(30) Foreign Application Priority Data
Aug. 13, 2016 (DE) .................... 20 2016 004 934.9

(51) Int. Cl.
*H02S 40/44* (2014.01)
*F24S 40/55* (2018.01)
*F28F 1/32* (2006.01)
(52) U.S. Cl.
CPC .............. *H02S 40/44* (2014.12); *F24S 40/55* (2018.05); *F28F 1/32* (2013.01)

(58) Field of Classification Search
CPC .............. H02S 40/44; F24S 40/55; F28F 1/32
See application file for complete search history.

(56) References Cited

U.S. PATENT DOCUMENTS

| | | | |
|---|---|---|---|
| 4,036,208 A | 7/1977 | Bauer | |
| 2004/0190260 A1* | 9/2004 | Sasaki | ................... H01L 23/467 257/E23.099 |

(Continued)

FOREIGN PATENT DOCUMENTS

| | | |
|---|---|---|
| CN | 102664209 A | 9/2012 |
| DE | 102007022164 A1 | 11/2008 |

(Continued)

OTHER PUBLICATIONS

English machine translation of FR2998095A1 (Year: 2022).*

(Continued)

*Primary Examiner* — Angelo Trivisonno
(74) *Attorney, Agent, or Firm* — The Webb Law Firm

(57) ABSTRACT

The problem is solved as follows: the photovoltaic thermal module consists of a photovoltaic module, on the rear side of which facing away from the sun a heat exchanger is located. The heat exchanger consists of at least one conduit through which heat transfer fluid flows. The conduits (which are optionally enlarged by heat transfer surfaces) are disposed at a distance from the photovoltaic module such that they are in good contact with the ambient air and also thermally conductively connected to the photovoltaic module. The surface area and the amount of heat exchange to the ambient air are increased by the main orientation of the surfaces of the heat exchanger running transversely to the PV module. As a result, a good flow of ambient air around both the heat exchanger and the rear side of the PV module (Continued)

Figure 1A:
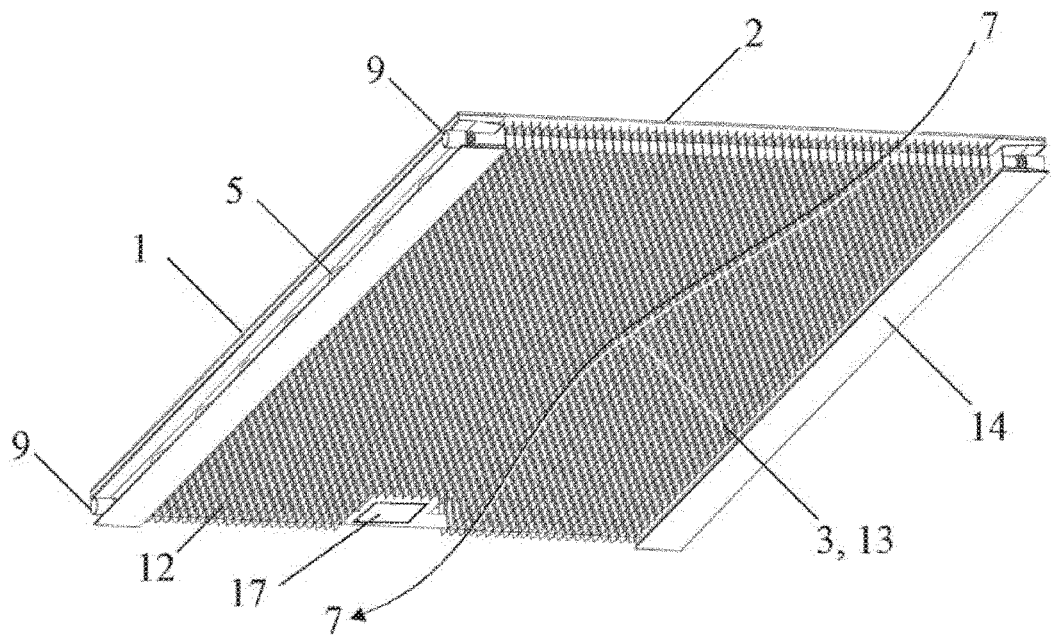

is made possible. The PVT module is used, in particular, in combination with heat pumps for supplying heat to and/or cooling buildings.

10 Claims, 5 Drawing Sheets

(56) References Cited

U.S. PATENT DOCUMENTS

| | | | |
|---|---|---|---|
| 2009/0173375 A1 | 7/2009 | Frazier et al. | |
| 2010/0288334 A1 | 11/2010 | Chu | |
| 2011/0139221 A1* | 6/2011 | Giritsch | F03G 6/001 |
| | | | 136/248 |
| 2013/0284237 A1* | 10/2013 | Lin | H01L 31/0488 |
| | | | 136/248 |
| 2014/0014162 A1* | 1/2014 | Chae | H02S 40/44 |
| | | | 136/248 |
| 2014/0166073 A1 | 6/2014 | Prakash et al. | |
| 2016/0336898 A1 | 11/2016 | Ponzio, Jr. | |

FOREIGN PATENT DOCUMENTS

| | | | |
|---|---|---|---|
| DE | 202008008747 U1 | 1/2009 | |
| DE | 102010013673 A1 | 10/2011 | |
| DE | 102011051918 A1 | 1/2013 | |
| DE | 102011055903 A1 | 6/2013 | |
| DE | 202016003756 U1 | 10/2017 | |
| FR | 2998095 A1 * | 5/2014 | ............. F24J 2/26 |
| FR | 2998095 A1 | 5/2014 | |
| WO | 2008110249 A1 | 9/2008 | |
| WO | 2009002350 A1 | 12/2008 | |
| WO | 2011076403 A2 | 6/2011 | |
| WO | 2012130429 A2 | 10/2012 | |

OTHER PUBLICATIONS

Adam et al., "Verbundprojekt: Standardisierung und Normung von multifunktionalen PVT Solarkollektoren (PVT-Norm)," 2014, 132 pages.

Glück et al., Simulationsstudie zur Integration von PV-Modulen und PVT-Kollektored in ein Solar-Wärmepumpensystem, OTTI Symposium Thermische Solarenergie, May 2014, 4 pages.

ISAN Radiatory s.r.o., ISAN TERMO Floor Convectors, Status 2013/2014, 48 pages.

"Aluventa Design Guideline," Aluventa, Jan. 10, 2012, 12 pages, Version 003.

* cited by examiner

PHOTOVOLTAIC THERMAL MODULE WITH AIR HEAT EXCHANGER

CROSS-REFERENCE TO RELATED APPLICATIONS

This application is the United States national phase of International Application No. PCT/EP2017/069742 filed Aug. 3, 2017, and claims priority to German Utility Model Application No. 20 2016 004 934.9 filed Aug. 13, 2016, the disclosure of each of which is hereby incorporated by reference in its entirety.

BACKGROUND OF THE INVENTION

Field of the Invention

The invention relates to a photovoltaic thermal module ("PVT module") for combined generation of electricity and heat. It is used, in particular, for providing low-temperature heat for heat pumps for generating hot water and building heat, and for building cooling, and at the same time covers at least part of the electricity requirement of the heat pump and/or of the household in this regard.

Description of Related Art

A plurality of PVT modules is known on the market, see, for example, [M. Adam, H. P. Wirth, R. Radasavljevic: Verbundprojekt: Standardisierung und Normung von multi-funktionalen PVT Solarkollektoren /Combined project for standardization and standards of multi-functional PVT solar collectors/ (PVT Norm /standard/), Abschlussbericht eines BMWi-geförderten Projekts der Fachhochschule Düsseldorf /Final report of a project of the Technical University of Dusseldorf, subsidized by the German Federal Ministry of Sciences/, 2014]. A description and discussion of the different PVT module types can be found in DE 20 2016 003 756.1. The invention described here corresponds to use of PVT modules as a low-temperature heat source, in particular for a heat pump. The studies presented in [Glück, C.; Faßnacht, T; Leibfried, U.: Simulationsstudie zur Integration von PV Modulen and PVT Kollektoren in ein Solar-Warmepumpensystem. /Simulation study for integration of PV modules and PVT collectors into a solar heat pump system/, 24$^{th}$ OTTI Symposium Thermische Solarenergie/ Thermal Solar Energy/, May 7-9, 2014, Bad-Staffelstein] show that PVT modules that are supposed to serve as the sole heat source of heat pumps require a heat transition coefficient of 40 W/(m$^2$ K) or more.

Studies have shown that in the case of surface areas in the range of 20 to 25 m$^2$, at an annual heat consumption of approximately 10,000 kWh, the greater part of the low-temperature heat is provided, during the coldest winter months, by withdrawing heat from the ambient air. For this reason, it is a task of the invention being presented here to configure the PVT module with an air heat exchanger in such a manner that the heat transition from the ambient air to the heat exchanger fluid is optimized.

A known disadvantageous effect of PVT modules that are coupled with heat pumps is icing, which occurs on the surface of the PV module, in particular at air temperatures slightly above 0° C. (humid air) and heat-medium temperatures below 0° C. This effect is also to be minimized with the invention.

It is the task of this invention to create a photovoltaic thermal module for combined generation of electricity and heat, which module has a high heat transition coefficient of the ambient air relative to that of the heat carrier medium, and at the same time is cost-advantageous in terms of production and installation, as well as reliable and long-lived in terms of operation. Furthermore, the following points are to be made possible, at least in embodiments of the invention:

Minimizing thermal stresses, transferred to the PV module by means of the heat exchanger structure, among other things in the case of thermal shock.

A small temperature difference between the PV module and the ambient air (minimizing icing), with good heat transfer between the ambient air and the heat carrier fluid, while utilizing the surface area of the PV module as a heat exchange surface.

Without cooling the module by means of the heat carrier fluid, the PV module is to be cooled well by ambient air.

Make it possible to use standard PV modules, so as to benefit from the cost regression.

Use of widespread efficient industrial production methods for the heat exchanger.

A photovoltaic thermal module for combined generation of electricity and heat is described in WO 2012/130429 A2. In the case of the apparatus described there, the effect of ice formation described above is to be minimized in that a space is provided between the PV module and the heat exchanger through which the cold fluid flows: There is a channel for a gas medium, in particular for air, between the PV module and the solar thermal module. Air serves for transferring the thermal energy from the PV module to the solar thermal module. The solar thermal module serves to absorb thermal energy, which was produced, in particular, by means of solar energy. The invention is intended, among other things, for at least partially supplying a heat pump with heat energy and electricity. For this use, it has the following disadvantages:

The temperatures that occur at the PV module due to radiation absorption are made available to the heat pump circuit not directly, but rather reduced by the thermal resistance of the air channel, with a reduced degree of effectiveness of the heat pump resulting from this.

Due to the insulating air gap between the PV module and the solar thermal module, the PV module is cooled only in restricted manner during heat pump operation, and therefore the degree of effectiveness of electrical conversion is only suboptimal.

The same holds true for times during which the heat pump is not running: Since ambient air cannot flow freely around the rear side of the PV module, it heats up more strongly than without the solar thermal module, and the degree of effectiveness of electrical conversion is reduced.

The surface of the PV module is used as a heat exchanger surface to the ambient air only in restricted manner, since is it not in connection with the solar thermal module in thermally conductive manner, and ambient air cannot flow freely around it on the rear side.

The heat transfer from the ambient air, which is essential for efficient functioning when using a combined photovoltaic thermal module during the winter, is only suboptimal as the result of the solar thermal surface element described, which runs parallel to the PV module.

Aside from this document, there are other documents in which a space or a thermal insulation is provided between the PV module and the heat exchanger:

In DE 10 2007 022 164 A1, an arrangement for obtaining electrical and thermal energy from solar radiation energy is presented. It consists of two "radiation capture surfaces," a first surface that primarily converts short-wave radiation to electrical energy, and a second surface, which lies at a distance behind the first, and primarily converts long-wave radiation to heat energy. The goal of the invention is that the greatest possible proportion of the long-wave radiation does not impact the "first energy generation apparatus," which generates electricity, so as to heat the "second energy generation apparatus" (=heat generation). In this regard, directly usable heat is to be generated in the "second energy generation apparatus." The distance between the two energy generation apparatuses is supposed to ensure that the heated second energy generation apparatus does not heat the first one, because its degree of effectiveness of electrical conversion would be reduced as a result.

The task and the proposed solutions do not correspond to the invention described here, in which the PV module is supposed to be used as a low-temperature heat source, in particular for a heat pump system for generating hot water and building heat and for building cooling. The structure of DE 10 2007 022 164 A1 is not advantageous for this task; see the discussion regarding WO 2012/130429 A2.

DE 10 2011 051 918 A 1 describes a similar structure: Here, too, the PV cell is semi-transparent or transparent, and is thermally and electrically insulated from the heat exchanger disposed behind it, among other things by means of a vacuum or gas.

A structure in which a space filled with $CO_2$, for example, is situated between the PV module and the heat exchanger disposed behind it is also described in US 2010/288334 A1.

These structures, too, are not advantageous for the task of this invention as described above.

SUMMARY OF THE INVENTION

The task is accomplished with a photovoltaic thermal module that consists of a photovoltaic module, which has a heat exchanger situated on its rear side, which faces away from the sun in the position of use. The heat exchanger consists of one or more line(s) through which the heat carrier fluid flows. The lines are disposed—possibly increased in size by heat exchanger surface areas in the surface toward the ambient air—in such a manner that they not only stand in good contact with the ambient air but are also connected with the PV module in thermally conductive manner. In this regard, the surface and the heat exchange toward the ambient air, relative to the surface of the photovoltaic module, is increased in size in that the surfaces areas of the heat exchanger are disposed, in their main orientation, not parallel but rather transverse to the plane of the photovoltaic module, i.e. perpendicular or at a slant relative to the PV module. In order to allow good flow of ambient air not only around the heat exchanger but also around the rear side of the PV module, the heat exchanger is disposed and oriented in such a manner that it does not hinder access of the ambient air to the PV module, or only hinders it slightly, as determined by the main orientation (perpendicular or at a slant relative to the PV module).

The line(s), to the extent that they are provided with heat exchanger surface areas that increase the size of the surface, are situated at a certain distance from the PV module, for example in the middle between the outer edge of the heat exchanger surface areas and the PV module. The distance of the outer edge of the heat exchanger surface areas from the PV module can amount to 100 mm, for example, or preferably to the typical frame height of photovoltaic modules of 30 to 60 mm.

The line(s) are therefore situated in a region in which ambient air can circulate better than protected directly behind the PV module. Furthermore, in this manner the heat conduction paths from the outer edge of the heat exchanger surface areas to the line(s) and from the PV module to the line(s) are similar, and this allows a reduced use of materials for the heat exchanger surface areas.

EXAMPLE

If the lines were situated directly on the rear side of the PV module, then the heat conduction path from the outer edge of the heat exchanger surface area to the line would be twice as great as when the line is situated in the center of the heat exchanger surface area, in other words between the PV module and the outer edge. For the same temperature decrease in the case of heat conduction, the heat exchanger surface area can be half as thick if positioned in the center.

The structure according to the invention can be implemented, among other things, by the following embodiments:

1. On the rear side of the PV module, there is a heat exchanger, which consists of one or more lines and heat exchanger surface areas applied to them. A widespread construction, produced using industrial processes, is a plate/air heat exchanger. The plates lie on the PV module and thereby stand in thermally conductive contact with the PV module. To ensure contact, the plates can be glued onto the PV module. Usual plate heat exchangers are terminated, on the outside, with stable sheet-metal end pieces. If these sheet-metal end pieces are shaped in adapted manner, they can be used directly for mechanical fixation of the plate/air heat exchanger on the PV module.

It is possible but not necessary to bend the edge of the plates by 90° on the side that rests on the PV module; this improves heat transition, and these bent surfaces can furthermore be glued onto the PV module.

2. One or more extruded profiles or extrusion profiles are laminated onto the rear side of the PV module. The extruded profile is shaped in such a manner that it holds the line, preferably be clipping it in, at a distance from the PV module, with good heat conductivity. Furthermore, the extruded profile is preferably provided with ribs that increase the size of the surface.

3. Another possible implementation of the invention is the use of one or more ribbed pipes, which stand in thermally conductive contact with the PV module. For this purpose, it is possible to fold the edge of the ribs over by 90° on the side that rests on the PV module, and to then glue these surfaces onto the PV module.

4. A similar structure is possible, using one or more wire heat exchanger pipes, as they are used, for example, in under-floor convectors. For the structure of wire heat exchangers, see, for example, the sales prospectus of the company ISAN Radiatory s.r.o., Czech Republic, www.isan.cz: "ISAN TERMO floor convectors, Status 2013/2014 01," page 2, called up at http://www.isan.cz/getattachment/Produkty/Termo-activ/Leaflet-TERMOEN.pdf.aspx.

5. As an alternative to plate coolers, "micro-channel profile" air heat exchangers are known, see, for example, http://aluventa.dk/ or the sales prospectus of the company Aluventa, Denmark, "Aluventa Design Guideline, Version: 003, Date: Jan.-10-2012," called up at http://aluventa.dk/wp content/uploads/2014/01/

Aluventa_Design_Guideline_v003_121001.pdf. Fundamentally, these are delicate double-crosspiece plates, i.e. flat hollow profiles, the opposite surfaces of which, delimiting a cavity, are connected with one another by means of crosspieces. The heat carrier fluid flows through the hollow profiles. They are situated between two collector pipes. Such double-crosspiece profile heat exchangers can also be affixed to the rear side of the PV module, for example by means of mechanical pressing, preferably combined with gluing. Since the heat conduction paths are very short here (heat conduction only through the wall of the profiles), this structure can also be implemented using plastic, i.e. using plastic double-crosspiece plates.

The typical distances between the plates, ribs or microchannel profiles are approximately 5 to 50 mm, in particular approximately 10 to 25 mm, whereby free convection of the ambient air is made possible, and the interstices are not closed off due to icing.

In particular, in the case of the embodiments described, where the contact between the heat exchanger and the photovoltaic module is present in the stated narrow distance (10 to 25 mm), it is not necessary to connect and cover the photovoltaic module with the heat exchanger over its full area, since the heat conduction paths in the photovoltaic module to the heat exchanger are sufficiently short: for example, in the case of a plate/air heat exchanger with a plate distance of 12 mm, the max. heat conduction path amounts to 6 mm at a usual glass thickness of 3 mm.

This allows an advantageous embodiment of the invention: The photovoltaic module is transparent between the PV cells, and the heat exchanger is coated to be dark or, even better coated selectively. This means that solar radiation passing through the transparent locations of the photovoltaic module is absorbed well on the coated surfaces of the heat exchanger, and in the case of selective coating emits only little infrared radiation. In this way, the PV module is not heated up unnecessarily, and this part of the radiation is nevertheless utilized for providing heat.

Typical materials of the photovoltaic thermal module are (in parentheses, the reference number of the figures presented below):
  channel structure or line (5) and collector pipe (9): copper, stainless steel, aluminum or plastic,
  heat exchanger surface areas (6), sheet metal plates (12): aluminum, copper,
  sheet-metal end piece (14) of the plate/air heat exchanger: aluminum,
  frame/gill profile (15): aluminum, plastic,
  double-crosspiece plates or "micro-channel profiles" (8): aluminum, plastic, stainless steel,
  rib pipe: aluminum, copper,
  profile (11): aluminum,
  adhesive (16): silicone, synthetic resin, epoxy resin, each enriched with heat-conductive, for example metallic fillers, if necessary, or, in the case of gluing over the entire area, double-sided adhesive film.

The photovoltaic thermal module is preferably coupled with heat pumps. Thermal coupling preferably takes place by way of brine as the heat carrier fluid, which flows through the sol/refrigerant heat exchanger (=evaporator) of a sol/water heat pump. In the case of operation in climate regions and use at which the temperature does not drop below the freezing point of water, water can also be used as the heat carrier fluid, and a water/water heat pump can be used.

Another—more efficient—possibility of coupling consists in that the refrigerant of the heat pump flows directly through the line(s) of the PVT module. This makes a circulation pump and a heat exchanger with the related temperature drop unnecessary.

The advantages of the invention are:
  high heat transition coefficient of ambient air to the heat carrier medium,
  cost-advantageous in terms of production, due to the structure optimized in accordance with the task, with regard to heat transfer from the ambient air, and due to the possibility of using industrial production methods,
  minimizing thermal stresses, transferred by the heat exchanger structure to the PV module, among other things in the case of thermal shock: Except in the case of the concept with extruded profiles, there is no covering and connection of the PV module with the heat exchanger over its full area.
  When using sheet metal plates, the metal sheets are preferably edged in corrugated shape, so that a longitudinal expanse or compression can be absorbed. Furthermore, the metal sheets do not have to be produced in one piece over their entire length, but rather can be produced from two or more pieces, for example. Likewise, in the case of the second embodiment presented above, with extruded profiles, these are preferably implemented in strips, and these strips also do not have to run over the entire length or width of the PV module, but rather can be divided up into two or more pieces, for example.
  Due to the arrangement of the line(s) at a distance from the PV module, the coldest location is here in direct contact with the ambient air. The PV module itself is situated at the end of the exchanger surface areas, so that its temperature lies closer to the ambient air temperature. In this way, the result is achieved that icing occurs, above all, in the region around the line(s), and is minimized at the PV module, which is nevertheless coupled directly with the heat exchanger, and contributes to the introduction of heat by means of air, humidity, rain, and radiation.
  By means of the direct coupling of the PV module and the heat exchanger, the PV module is cooled well by the ambient air, even without cooling of the module by the heat carrier fluid.
  Standard-PV modules, in particular laminates without frames, can be used for implementing the invention, in that the air heat exchanger is applied during a subsequent production process, and thereby the benefit of the cost regression of the PV modules is achieved.

DESCRIPTION OF THE INVENTION

In the following, concrete embodiments of the invention will be described using FIGS. 1 to 8.

FIGS. 1a, b and c show a photovoltaic thermal module 1 according to claims 1 and 7 to 9. FIG. 1a shows the view of the module from above, 1b at a slant from below, and 1c a top view from below.

Here, the heat exchanger 3 is configured as a plate/air heat exchanger 13, and is situated on the underside of the photovoltaic module 2. It consists of a meander-shaped line 5 (see FIG. 1c), which is connected, at the top and the bottom, in each instance, with a collector pipe 9. The collector pipes 9 allow easy parallel switching of multiple modules. The line 5 and the collector pipes 9 vertically penetrate a number of wave-shaped sheet metal plates 12 that run parallel. On the side, the plate/air heat exchanger 13 is delimited by a sheet-metal end piece 14 (not shown in FIG. 1c), for example. The sheet-metal end pieces 14 stabilize the photovoltaic module 2, and can be used for fixation of the photovoltaic thermal module 1 on an installation framework, i.e. a separate frame is not required. Furthermore, they protect the plate/air heat exchanger 13 against damage during installation. The 180° arcs of the meander-shaped line run within the horizontal indentations of the sheet-metal end pieces 14.

The sheet-metal plates 12 are shorter at the location where an electrical connection box 17 of the photovoltaic module 2 is situated, so that room remains for the connection box. The line 5 can be shaped in such a manner that is runs next to the connection box 17 (see FIG. 1c); however, due to its distance from the photovoltaic module 2, it can also run by way of the connection box 17 (not shown). The connection box is shown at the bottom in FIGS. 1a and 1c, but it can also be disposed at the top.

The upper and lower face side of the photovoltaic thermal module 1 are open, i.e. they do not have a frame. In this way, ambient air 7 can freely flow around the rear side of the photovoltaic thermal module with an air heat exchanger 1, and penetrate into the interstices of the plate/air heat exchanger 13 (see FIG. 1 a). In this regard, it is cooled and drops downward. The heat carrier medium 4, which flows within the collector 9 and line 5, generally flows from top to bottom for the purpose of reliable ventilation, so that an efficient counter-stream heat exchange or cross-counter-stream heat exchange occurs between the ambient air 7 and the heat carrier medium 4 (see FIG. 1c).

The photovoltaic thermal module 1 is shown upright in FIG. 1a, b, c. According to the invention, it is likewise possible to structure the photovoltaic thermal module 1 transversely, wherein the sheet-metal plates preferably also run perpendicular from top to bottom, and the lines 5 run horizontally, so as to allow good ventilation of the line 5 and vertical flow of the ambient air 7 around the line.

Figure 1B:
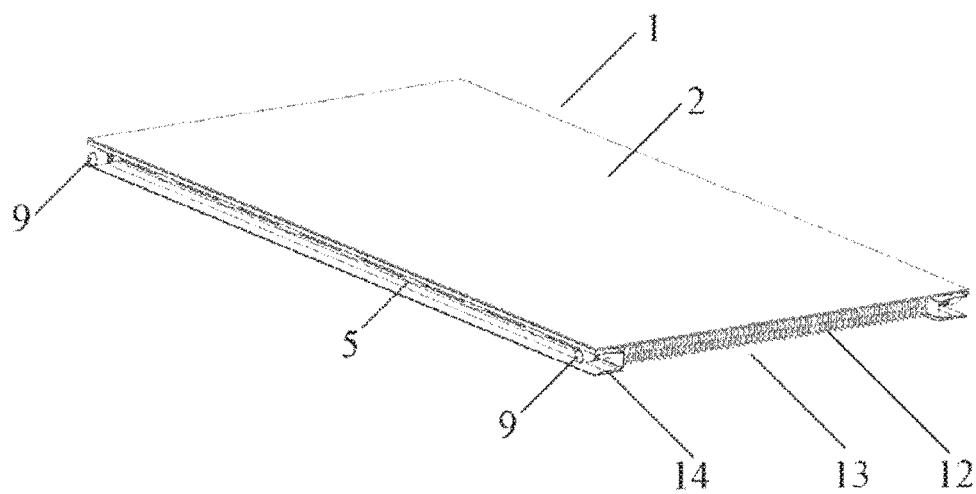
Figure 1C:
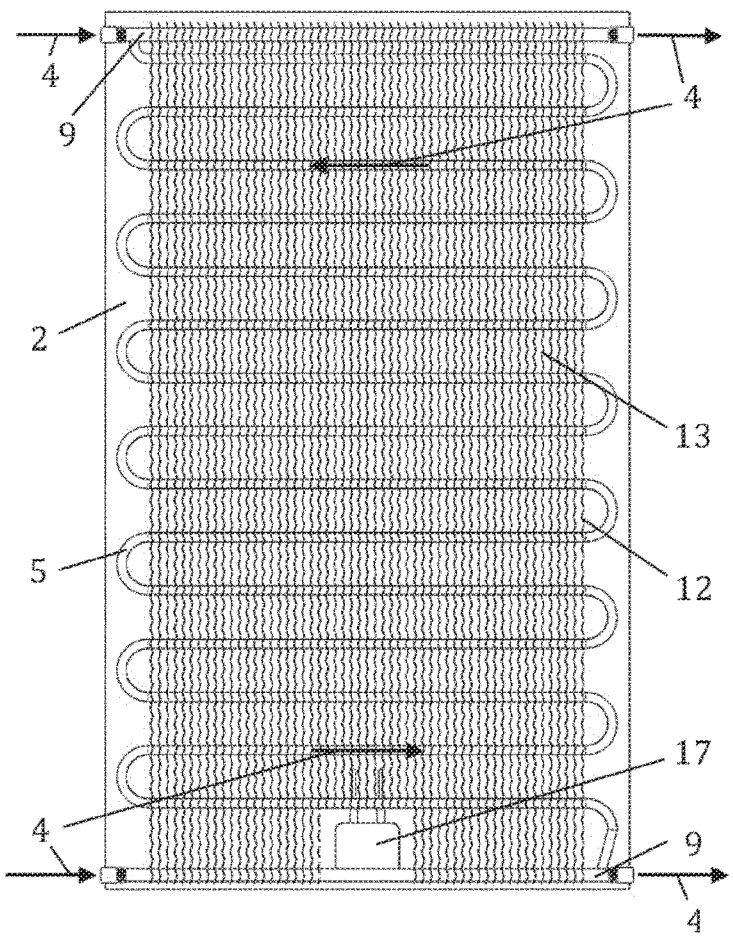
Figure 2:
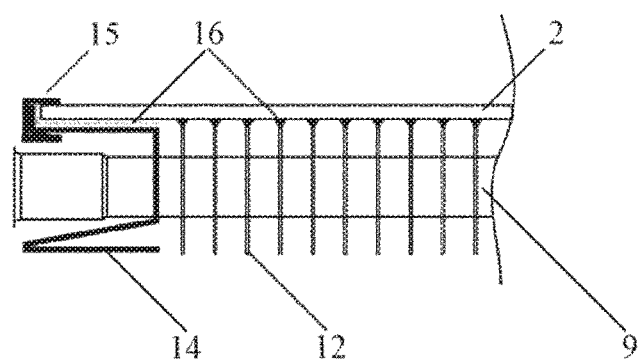

FIG. 2 shows a detail of the photovoltaic thermal module 1 shown in FIG. 1. The sheet-metal end piece 14, which is preferably produced as an aluminum extruded profile, is connected with the photovoltaic module 2 using a frame/gill profile 15. The sheet-metal plates 12 and the sheet-metal end piece 14 are additionally glued to the photovoltaic module 2 using an adhesive 16. The collector pipe 9 has a widened region on its left outer side, to hold a plug-in connector for coupling with the next module.

Figure 3:
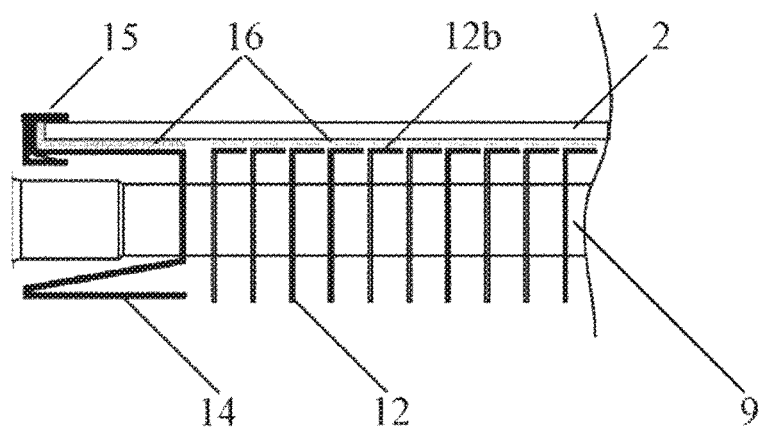

FIG. 3 shows the same detail as FIG. 2. Here, the sheet-metal plates 12 are bent away on the side with which they lie on the PV module 2. The bent-away regions 12b allow a connection with the PV module over its full area, i.e. improved heat dissipation and possibly easier application of the adhesive 16, for example in the form of a double-sided adhesive film.

Figure 4:
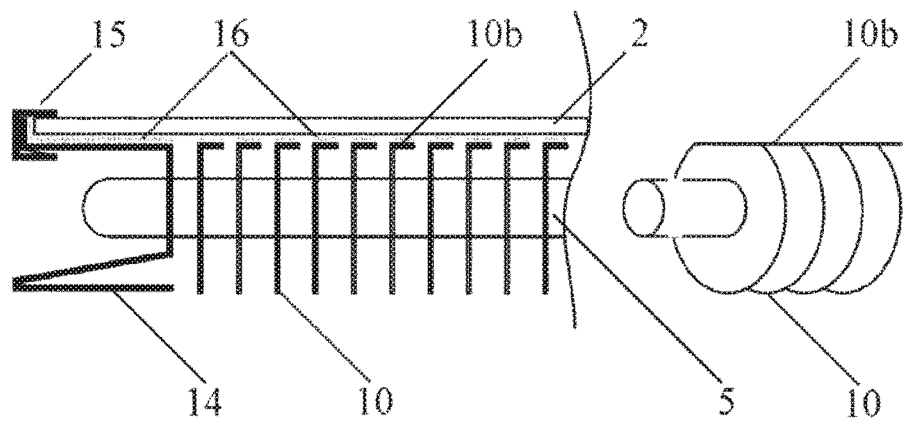

FIG. 4 shows the structure of the photovoltaic thermal module 1 implemented with a ribbed pipe. The ribs 10 are bent away on the side with which they lie against the PV module 2; this can be done during the bending process of the ribbed pipe. The bent-away or folded-over regions 10b allow a connection with the PV module over its full area, analogous to what was described above for sheet-metal plates 12 in FIG. 3. The ribbed pipe 10 can be bent in meander shape, for example, analogous to the structure shown in FIG. 1c.

Figure 5:
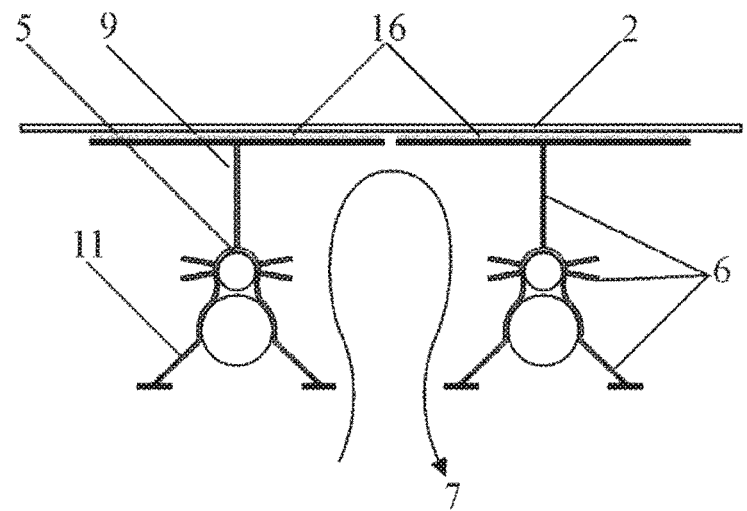

FIG. 5 shows the structure of the photovoltaic thermal module 1 implemented with extruded profiles: Multiple extruded profiles 11 are laminated onto the rear side of the PV module, with contact to the PV module 2 over its full area, using the adhesive 16. At a distance from the PV module, the line 5 is held with good heat conductivity by clipping it in. In a widened profile region that is situated above that, the collector pipe 9 is also held by clipping it in. Furthermore, the extruded profile is provided with heat exchanger surface areas 6 that increase the size of its surface. At the bottom, the profile has widened regions, which serve as a stable contact region during installation. Ambient air 7 can flow between the profiles 11 to the photovoltaic module 2.

Figure 6:
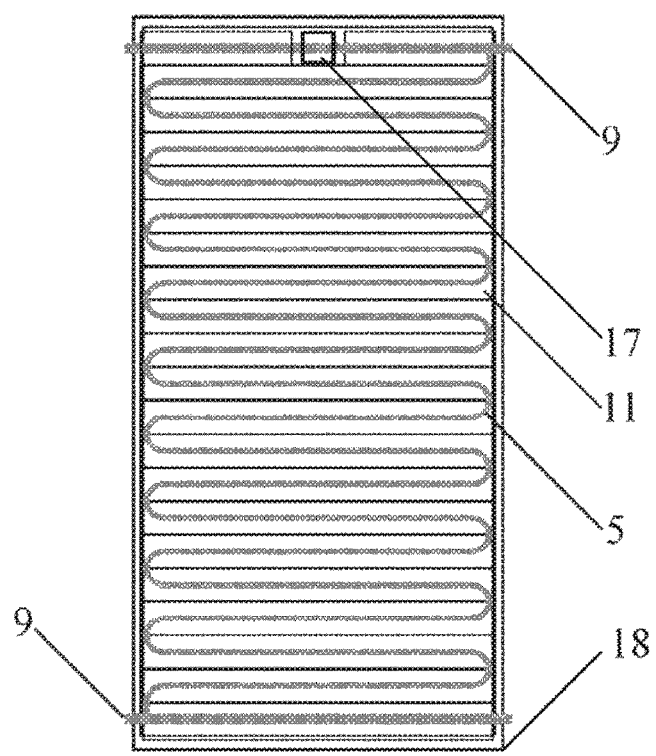

FIG. 6 shows the rear side of the photovoltaic thermal module structured in accordance with FIG. 5. The profile 11 is laminated on in pieces that run parallel, which are correspondingly shorter at the electrical connection box 17. A line 5 bent in meander shape, as well as the two collector pipes 9, are clipped into the profile 11. The photovoltaic thermal module is enclosed by the frame 18.

The photovoltaic thermal module 1 is shown upright in FIG. 6. It can also be structured transversely, wherein the profiles 11 with the lines 5 preferably continue to be disposed horizontally, for good ventilation.

Figure 7:
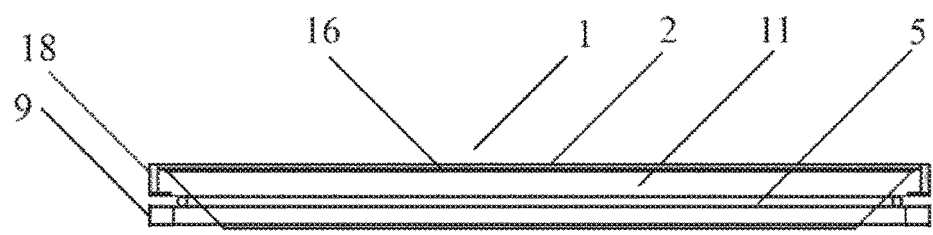

FIG. 7 shows a cross-section of the photovoltaic thermal module 1 structured in accordance with FIGS. 5 and 6. The profiles 11, which are glued onto the PV module 2 using the adhesive 16, project downward beyond the frame 18 of the photovoltaic thermal module 1, so that the ambient air can flow around them well. The profiles have 45° bevels on the right and the left, so that the 180° arcs of the line 5, which is bent in meander shape, can run outside of the profile. The collector pipes 9 are affixed below the line 5.

Figure 8:
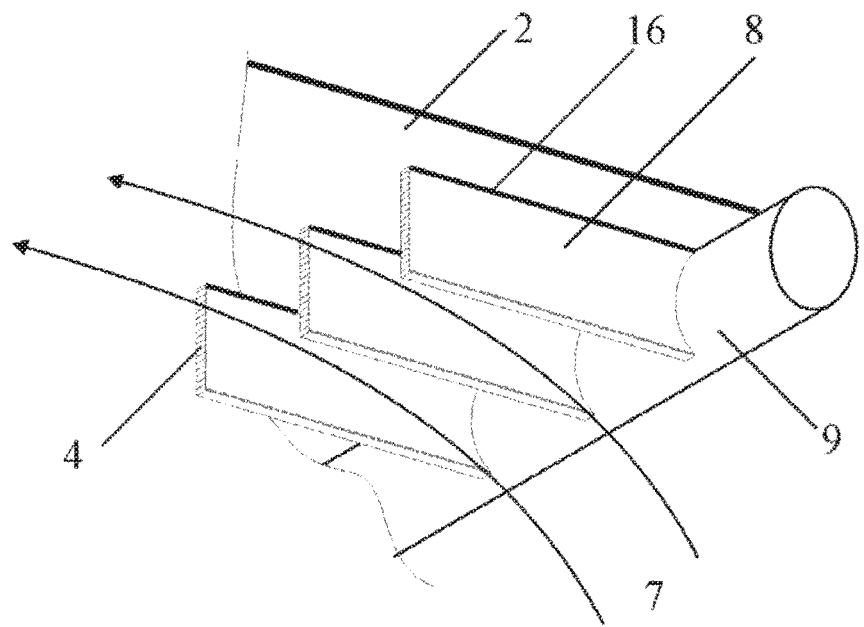

FIG. 8 shows, seen from below, the structure of the photovoltaic thermal module 1 implemented using "microchannel" or "double-crosspiece" profiles. The double-crosspiece profiles 8 are structured as flat hollow profiles, the two opposite delimiting surfaces of which are connected with one another using crosspieces. The heat carrier fluid 4 flows through the double-crosspiece profiles 8. They are situated between two collector pipes 9 (here, only the detail with one collector pipe is shown). The heat carrier fluid 4 flows through the double-crosspiece profiles 8, in parallel. They are in contact with the rear side of the PV module 2, and connected using the adhesive 16. Ambient air 7 can flow through the double-crosspiece profiles 8 and the photovoltaic module 2.

Instead of the embodiments described, other embodiments are also possible according to the invention: for example, according to claim 1, also other heat exchangers through which heat carrier medium flows are possible, for example heat exchangers produced using the roll-bond method. Instead of the meander-shaped piping shown in FIGS. 1 to 7, other types of piping are also possible, for example with parallel through-flow as in the structure according to FIG. 8. Vice versa, the structure with double-crosspiece profiles can also be implemented differently than between two collector pipes 9, for example in meander form.

REFERENCE SYMBOL LIST 1 photovoltaic thermal module with air heat exchanger
2 photovoltaic module
3 heat exchanger
4 heat carrier fluid channel structure or line for heat carrier fluid
5 surface-increasing heat exchanger surface area to the ambient air
6 ambient air
7 double-crosspiece profile or "micro-channel" profile
8 collector pipe
9 rib of ribbed pipe, 10b: folded-over part
10 profile 11 sheet-metal plate, 12b: bent-away part
12 plate/air heat exchanger
13 sheet-metal end piece of the plate/air heat exchanger
14 frame/gill profile
15 adhesive
16 electrical connection box
17 frame of the photovoltaic thermal module

The invention claimed is:

1. A photovoltaic thermal module for combined generation of electricity and low-temperature heat for heat pumps for generating hot water and building heat, and for building cooling, having a photovoltaic module, on the rear side of which, in the position of use, facing away from the sun, a heat exchanger is situated, wherein the heat exchanger is structured as a plate/air heat exchanger comprising a plurality of interstices, which comprises one or more lines and sheet-metal plates applied to them, wherein the sheet-metal plates are in thermally conductive contact with the photovoltaic module, wherein the heat exchanger comprises sheet-metal end pieces which are structured in such a manner that they serve directly for fixation of the plate/air heat exchanger on the photovoltaic module, wherein the heat exchanger contains at least one channel structure or line through which a liquid or gaseous heat carrier fluid flows, the at least one channel structure or line situated at a distance from the photovoltaic module, wherein the at least one channel structure or line not only stands in direct contact with the ambient air, but also is connected with the photovoltaic module in a thermally conductive manner to form a thermally conductive contact, wherein the thermally conductive contact between the at least one channel structure or line and the photovoltaic module is implemented by means of mechanical pressing combined with gluing, wherein the surface areas of the heat exchanger that stand in contact with the ambient air are disposed transversely to the plane of expanse of the photovoltaic module and lie directly on the photovoltaic module without coverage and connection over a full area of the photovoltaic module, wherein free spaces are provided between the surface areas of the heat exchanger, wherein the free spaces between the surface areas of the heat exchanger are configured to provide access to the ambient air for the photovoltaic module, and wherein, in conditions when the temperature of the heat carrier fluid is below a freezing point, an accumulation of an amount of ice occurs that does not close the plurality of interstices, and the accumulation of the amount of ice is higher at the at least one channel structure or line than at the photovoltaic module.

2. The combined photovoltaic thermal module according to claim 1, characterized in that the heat exchanger is built up from double-crosspiece profiles, which are disposed transversely to the photovoltaic module.

3. The combined photovoltaic thermal module according to claim 1, characterized in that the at least one channel structure or line of the heat exchanger has a surface area which is configured to increase in size from a first size to a second size.

4. The combined photovoltaic thermal module according to claim 3, characterized in that the heat exchanger has at least one line with surface-increasing ribs.

5. The combined photovoltaic thermal module according to claim 3, characterized in that the heat exchanger has at least one line with surface-increasing wires.

6. The combined photovoltaic thermal module according to claim 1, characterized in that the edge of the ribs or of the sheet-metal plates is bent away on the side facing the photovoltaic module, and as a result lies against the photovoltaic module with an increased contact surface.

7. The combined photovoltaic thermal module according to claim 1, characterized in that the photovoltaic module is transparent between the PV cells, and the heat exchanger is a dark color to absorb solar radiation.

8. The combined photovoltaic thermal module according to claim 1, characterized in that the photovoltaic module is transparent between the PV cells, and the heat exchanger is selectively coated to absorb solar radiation, at a reduced emission of infrared radiation.

9. The combined photovoltaic thermal module according to claim 8, characterized in that the photovoltaic thermal module is coupled with a heat pump, and the refrigerant of the heat pump flows directly through the at least one channel structure or line of the photovoltaic thermal module.

10. The combined photovoltaic thermal module according to claim 1, wherein the sheet-metal end pieces serve as a frame of the photovoltaic module.

\* \* \* \* \*